No. 669,097. Patented Mar. 5, 1901.
J. A. ORR.
BICYCLE TIRE.
(Application filed Jan. 8, 1900.)

(No Model.)

Witnesses:

Edwin B. H. Tower, Jr.

Inventor
John A Orr

Attys.

United States Patent Office.

JOHN ARMSTRONG ORR, OF FLORENVILLE, LOUISIANA.

BICYCLE-TIRE.

SPECIFICATION forming part of Letters Patent No. 669,097, dated March 5, 1901.

Application filed January 8, 1900. Serial No. 678. (No model.)

*To all whom it may concern:*

Be it known that I, JOHN ARMSTRONG ORR, a citizen of the United States, residing at Florenville, in the parish of St. Tammany and State of Louisiana, have invented certain new and useful Improvements in Bicycle-Tires; and I do hereby declare the following to be a full, clear, and exact description of the invention, such as will enable others skilled in the art to which it appertains to make and use the same.

My invention relates to certain improvements in tires, particularly bicycle-tires.

It has for its object, primarily, to prevent the collapsing of the tire in event of puncture and to provide for lightness, durability, and strength, also cheapness of manufacture, while the comfort of the rider is promoted, being relieved of apprehension of the collapse of the tire from the cause above stated, as heretofore experienced in the use of this general class of tires.

It consists of a tubular or hollow circular casing or covering preferably formed or made of rubber, leather, or cloth of different layers or plies, as desired, with a compact filling or core of solid or non-granular cork compassed by said casing or covering, the whole being suitably held or secured upon the rim of the wheel, substantially as hereinafter more fully disclosed and specifically pointed out in the claim. In the manufacture of this class of tires numerous ways or structures have been devised especially to provide a filling or core for the outer casing or "tread," principally to either promote lightness or speediness or reduce cost of manufacture. All of these have drawbacks of greater or less moment which have received considerable time, thought, and attention and yet without having seemingly reached a satisfactory solution of the situation.

I have found by the employment of a filling or core of solid cork compactly or tightly fitted into a rubber or other suitable tire or tread practicable and tangible results are obtainable, in that a light and inexpensive tire is secured and one which will not collapse or become suddenly unfit for use from puncture—a very great annoyance, as well known, experienced in the use of the pneumatic tire.

Figure 1:
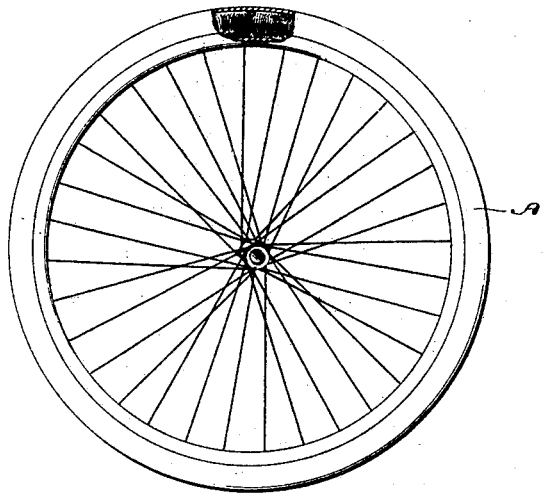
Figure 2:
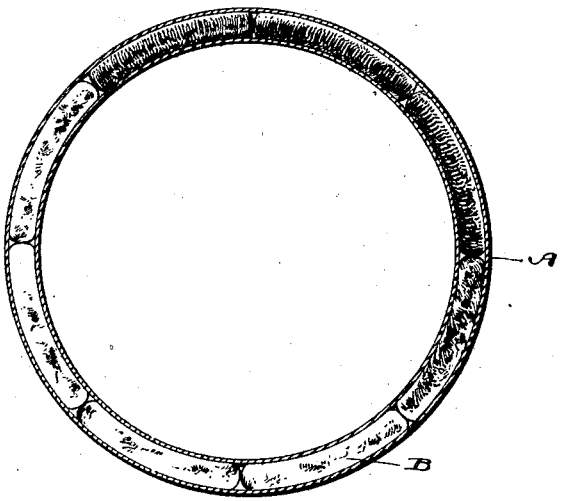
Figure 2:
Figure 2:

In the accompanying drawings, illustrating the preferred embodiment of my invention, Figure 1 is a perspective view of a wheel of the bicycle type with my tire applied thereto. Fig. 2 is a broken sectional view thereof, disclosing the interior filling or core.

In carrying out my invention I provide a tubular casing or tread A, preferably of rubber, leather, or cloth, of a number of layers, constructed and applied to the wheel-rim in the usual way. In this tubular or hollow tread or casing, in the present instance shown as made of rubber, I compactly insert or fit a core or filling of solid or ungranulated cork B, as shown more particularly in Fig. 2, the same tightly and compactly fitting said tread or casing, thus filling out the same symmetrically and solidly to its utmost limits. Thus it will be seen that any punctures the rubber or textile tread or casing may receive will have no effect whatever in causing the collapse of the tire, the puncturing object, even if passing through the tread or tire proper and driven with sufficient force, simply penetrating the solid body of cork without doing harm or otherwise caused to rebound and prevented from adhering.

The cork filling or core is put into the rubber tube or casing in sections B', with their ends convexed and abutting against each other to enable said sections to rock to a greater or less extent when the wheel is in motion, thus providing against the cork "edging" into contact with the rubber tread or tube, which would be objectionable and possibly liable to injure or rupture said tube. This construction of tire is also durable, strong, and cheaply manufactured and resists premature wear, while, it is obvious, it will possess the requisite elasticity or resiliency and lightness and render it speedy and light-traveling.

Latitude is allowed herein as to details, as they may be changed without departing from the spirit of my invention, and the same yet remain intact and be protected.

Having thus fully described my invention, what I claim, and desire to secure by Letters Patent, is—

A bicycle-tire comprising a tube and a series of cork sections or cores filling said tube, each having rounded or convex end portions adapted to pivot one upon the other, substantially as set forth.

In testimony whereof I affix my signature in presence of two witnesses.

JOHN ARMSTRONG ORR.

Witnesses:
N. PLANCHE,
F. PLANCHE.